(12) United States Patent
Naito

(10) Patent No.: US 8,567,673 B2
(45) Date of Patent: Oct. 29, 2013

(54) CODE READER, SALES DATA PROCESSING APPARATUS AND METHOD

(75) Inventor: Hidehiro Naito, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/424,583

(22) Filed: Mar. 20, 2012

(65) Prior Publication Data

US 2012/0248184 A1 Oct. 4, 2012

(30) Foreign Application Priority Data

Mar. 31, 2011 (JP) .................................. 2011-080793
Jan. 16, 2012 (JP) .................................. 2012-006508

(51) Int. Cl.
*G06K 15/00* (2006.01)

(52) U.S. Cl.
USPC .......................................... 235/383; 235/375

(58) Field of Classification Search
USPC .................. 235/383, 375, 487, 440
See application file for complete search history.

(56) References Cited

U.S. PATENT DOCUMENTS

| | | | |
|---|---|---|---|
| 5,898,158 A | 4/1999 | Shimizu et al. | |
| 7,464,876 B2 | 12/2008 | Suzuki et al. | |
| 2001/0030237 A1* | 10/2001 | Courtney et al. | 235/462.4 |
| 2009/0171801 A1* | 7/2009 | Ryo | 705/23 |
| 2009/0250516 A1 | 10/2009 | Tsuchiya et al. | |
| 2012/0217302 A1 | 8/2012 | Naito et al. | |

FOREIGN PATENT DOCUMENTS

| | | |
|---|---|---|
| JP | 07-141569 | 6/1995 |
| JP | 2006-309451 | 11/2006 |
| JP | 2009-020611 | 1/2009 |
| JP | 2009-129266 | 6/2009 |
| JP | 2010-108349 | 5/2010 |

OTHER PUBLICATIONS

Japanese Office Action for Japanese Patent Application No. 2012-006508 mailed on May 21, 2013.

* cited by examiner

*Primary Examiner* — Edwyn Labaze
(74) *Attorney, Agent, or Firm* — Turocy & Watson, LLP

(57) ABSTRACT

According to an embodiment, a code reader, comprising: an imaging pickup unit; a light source configured to irradiate light onto an imaging pickup area by the imaging pickup unit; a switching unit configured to switch between a code reading mode applicable for the imaging pickup unit to image pickup a code symbol in the imaging pickup area and a second mode which is carried out the control which is different from the control carried out in the code reading mode; and a light source control unit configured to enable the light source to illuminate light by changing light illuminating patterns when the switching unit switches between the code reading mode and the second mode.

13 Claims, 13 Drawing Sheets

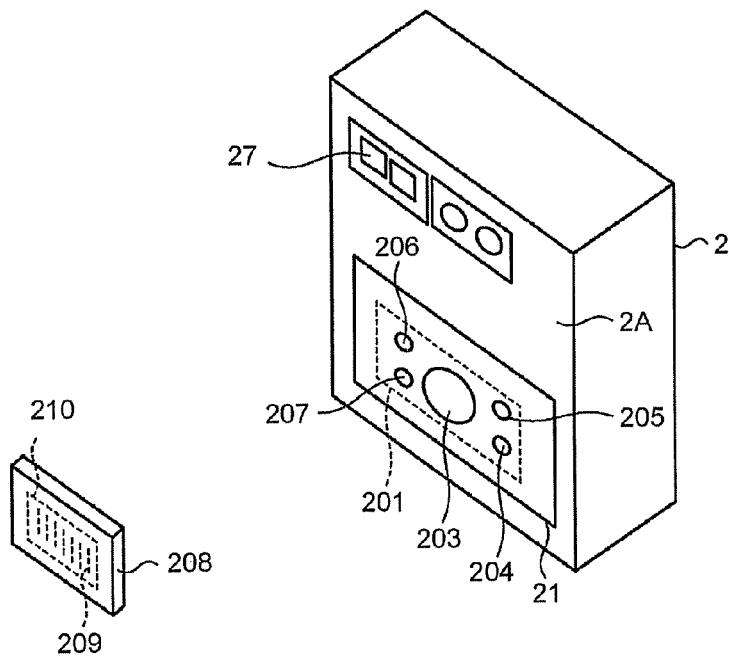
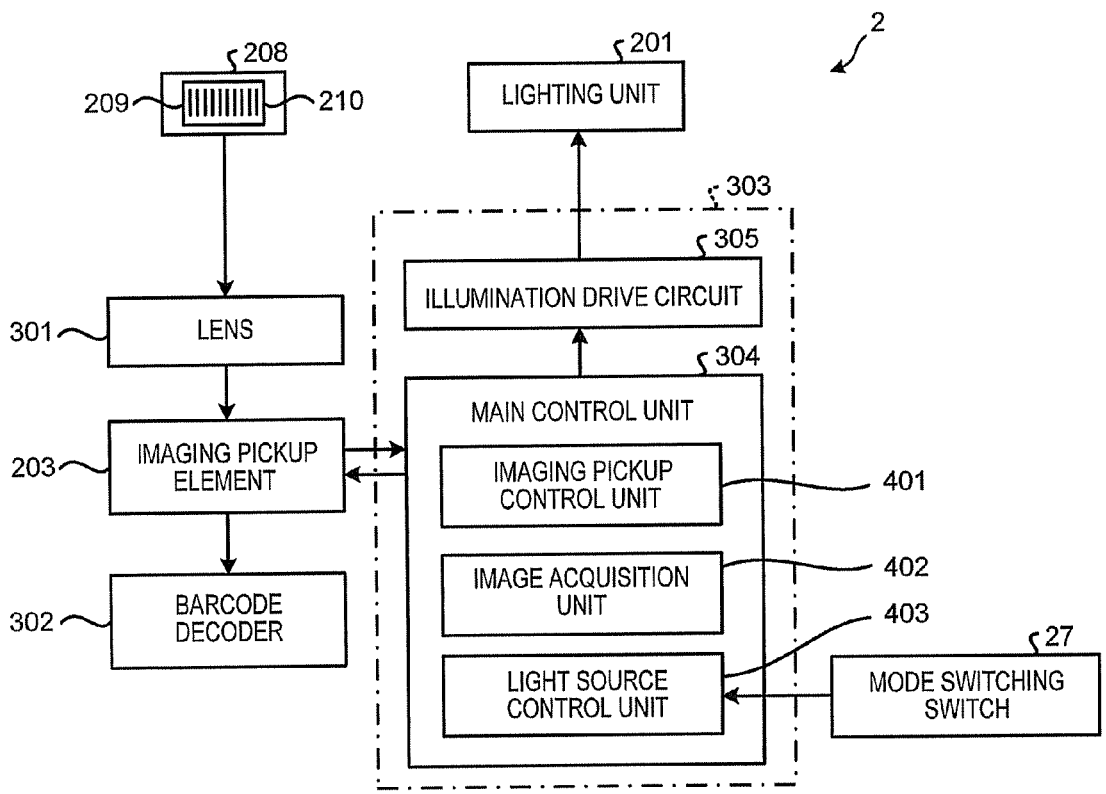

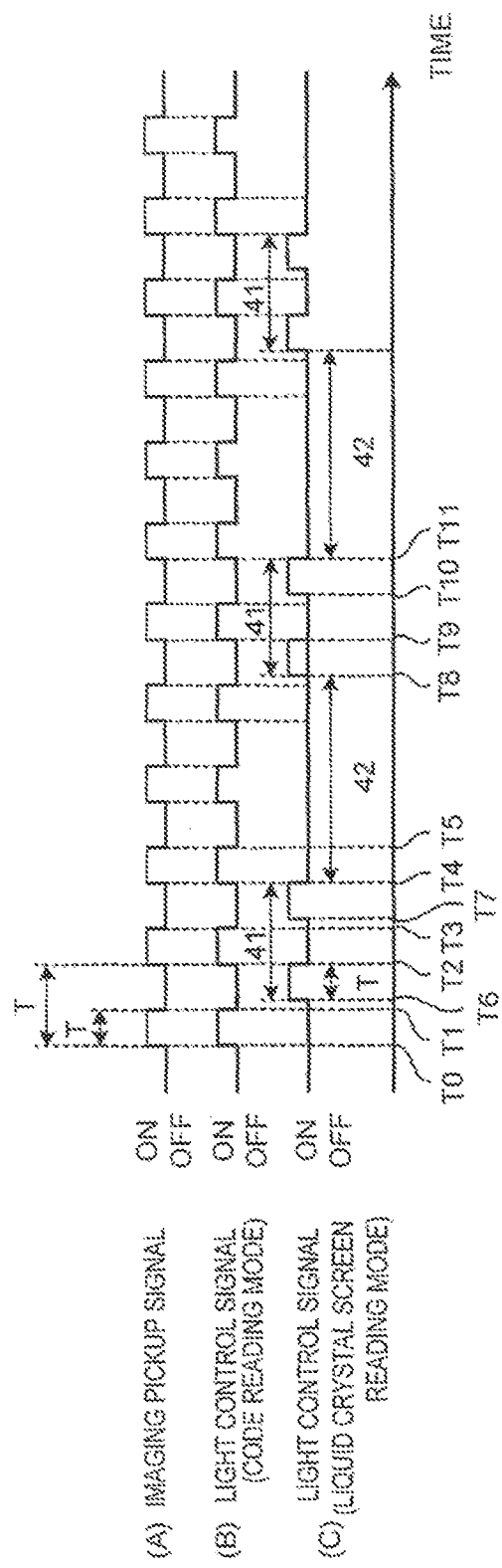

FIG. 12

| COMMODITY CODE | COMMODITY NAME | UNIT PRICE | SET WEIGHT RANGE | DISCOUNT FLAG | DISCOUNTED PRICE | DISCOUNT CODE |
|---|---|---|---|---|---|---|
| 000001 | ○○○○ | 100 | 100±10% | 1 | 50 | ***** |
| 000002 | ○○○○ | 200 | 150±10% | 0 | — | — |
| 000003 | ○○○○ | 150 | 200±10% | 0 | — | — |
| ... | ... | ... | ... | ... | ... | ... |

81

CODE READER, SALES DATA PROCESSING APPARATUS AND METHOD

CROSS-REFERENCE TO RELATED APPLICATION

The present application contains subject matter related to that disclosed in Japanese Priority Patent Application No. 2011-080793 filed in the Japan Patent Office on Mar. 31, 2011 and Japanese Priority Patent Application No. 2012-006508 filed in the Japan Patent Office on Jan. 16, 2012 the entire contents of which are hereby incorporated by reference.

FIELD

Embodiments described herein relates to a code reader, a sales data processing apparatus and method.

BACKGROUND

In a code symbol reader in which a CCD (Charge Coupled Device Image Sensor) imaging pickup element, etc. pickup the image of a code symbol using an area image sensor and then outputs the pickup commodity code, in order to guarantee the brightness for the imaging pickup, the code symbol is irradiated by the light from a light source while the area image sensor is picked up an image, as an optical illusion will be caused if light is continuously irradiated from the light source, light is irradiated at certain time intervals during the period in which no image is picked up by the area image sensor.

BRIEF DESCRIPTION OF THE DRAWINGS

FIG. 2 is an external perspective view illustrating the structure of the code reader;

FIG. 3 is a block diagram illustrating the structure of the code reader;

FIG. 4 is a timing chart illustrating an output timing of a light control signal in a code reading mode and a liquid crystal screen reading mode;

FIG. 12 is a view illustrating an example of the structure of a commodity master;

DETAILED DESCRIPTION

According to an embodiment, a code reader, comprising: an imaging pickup unit; a light source configured to irradiate light onto an imaging pickup area by the imaging pickup unit; a switching unit configured to switch between a code reading mode applicable for the imaging pickup unit to image pickup a code symbol in the imaging pickup area and a second mode which is carried out the control which is different from the control carried out in the code reading mode; and a light source control unit configured to enable the light source to illuminate light by changing light illuminating patterns when the switching unit switches between the code reading mode and the second mode.

(First Embodiment)

Figure 1:
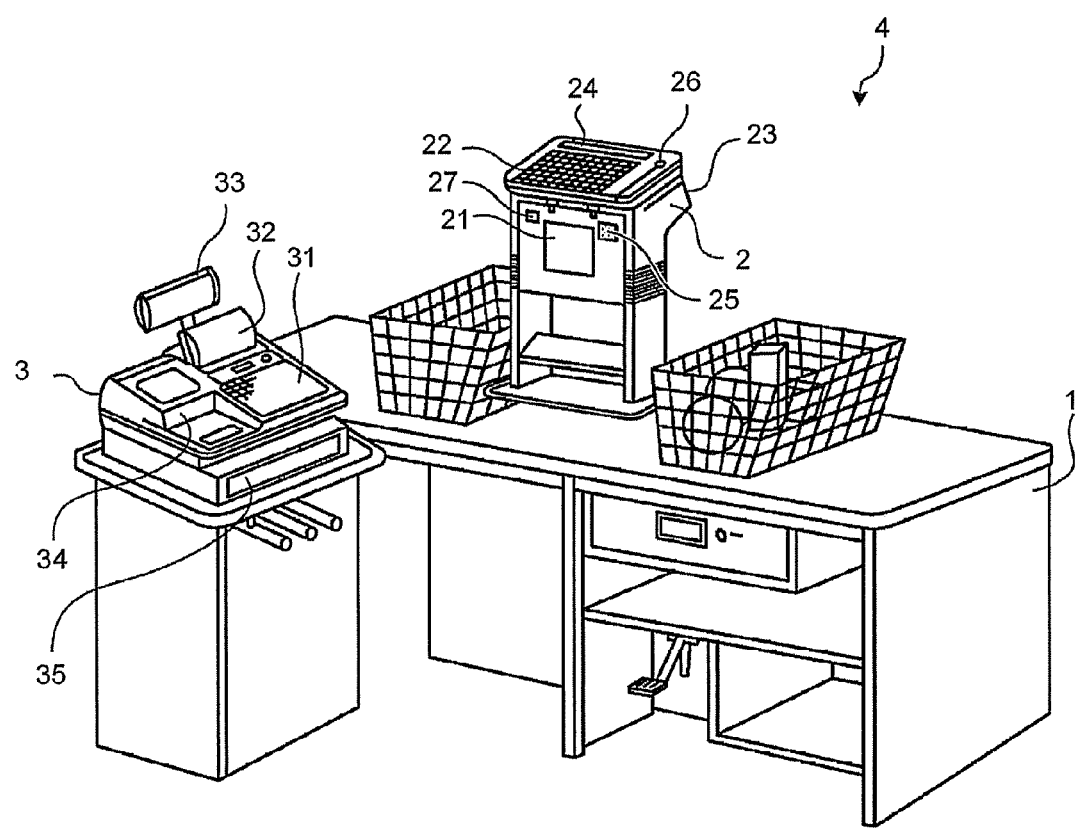
FIG. 1 is an external perspective view illustrating the structure of clearing lane system provided with a code reader of a first embodiment.

FIG. 1 is an external perspective view illustrating the structure of clearing lane system provided with a code reader of a first embodiment. As shown in FIG. 1, the checkout lane system comprises: a sucker table 1 configured to hold a shopping basket containing commodities; a code reader 2 that is vertically configured at the substantially center position of the sucker table 1; and a POS terminal 3 that is connected with the code reader 2 by a transmission path (not shown) to communicate with the code reader.

The POS terminal 3 registers the sales of the commodities purchased by a customer. As shown in FIG. 1, a keyboard 31, an operator-oriented display 32, a customer-oriented display 33, a printer 34 for printing invoices and the like and a cash drawer 35 for accommodating cash are configured on the POS terminal 3. A closing key for the account settlement of commodities is configured on the keyboard 31. The POS terminal 3 has the same structure and function with the standard POS terminal used in this checkout lane system.

The code reader 2 is a device for reading the barcode adhered on a commodity and receiving the commodity information contained in the barcode to the POS terminal 3. As shown in FIG. 1, the code reader 2 mainly comprises a reading window 21, a keyboard 22, a customer-oriented display 23, a shop assistant-oriented display 24, a buffer 25, an LED 26 and a mode switching switch 27.

In the case where a commodity may not be registered using a barcode, the input of various keys is accepted by the keyboard 22. The customer-oriented display 23 is configured to display the name and the price of a registered commodity for a customer or shop assistant. The shop assistant-oriented display 24 is configured to display the name and the price of a registered commodity as well as other error information for an operating shop assistant.

An imaging pickup element 203 (referring to FIG. 2) is configured in the code reader 2 provided with the reading window 21. The imaging pickup element 203, which may be, for example, a imaging pickup device using a CCD (Charge Coupled Device) or CMOS (Complementary Metal Oxide Semiconductor) or the like, pickups the image of a code symbol (barcode or two-dimensional code) placed in a imaging pickup area opposite to the reading window 21 or the image of a liquid crystal screen.

The mode switching switch 27 is a switch switching between a code reading mode and a liquid crystal screen reading mode. The code reading mode refers herein to a mode applicable for the use of a light irradiation method of imaging pickup a code symbol such as a barcode with the imaging pickup element 203 (referring to FIG. 3). On the other hand, the liquid crystal screen reading mode refers herein to a mode applicable for the use of a light irradiation method of imaging pickup the liquid crystal screen of a portable electronic terminal with the imaging pickup element 203 (referring to FIG. 3).

In this embodiment, the code reading mode is usually used; however, when the mode switching switch 27 is pressed down, the mode is switched to the liquid crystal screen reading mode. Moreover, the liquid crystal screen reading mode is switched to the code reading mode if a predetermined period of time elapses from the moment the mode switching switch 27 is pressed down. By switching to the liquid crystal screen reading mode in this way, the code reader 2 may pickup a discount coupon image displayed on the liquid crystal screen of a portal electronic terminal and read the discount information from the pickup image to be used in commodity sales.

FIG. 2 is an external perspective view illustrating the structure of the code reader 2. As shown in FIG. 2, the code reader 2 comprises an imaging pickup element 203, a lighting unit 201 and the mode switching switch 27 on the front surface 2a of the main body. A commodity 208 is placed opposite to the front surface 2a of the code reader 2 by the operator. A piece of paper 210, on which a barcode 209 is printed, is adhered on the commodity 208. When reading the barcode 209 with the code reader 2, the operator manually adjusts the barcode 209 printed on the paper 210 adhered on the commodity 208 into an imaging pickup area by the imaging pickup element 203. Moreover, although this embodiment is described based on an example in which the object read by the code reader 2 is the barcode 209, the present invention is not limited to this, any code symbol, as long as it is a two-dimensional code, may be the read object of the code reader 2.

The imaging pickup element 203 receives reflected light from an image located on the front surface 2a of the code reader 2 and containing the barcode 209, that is the barcode 209, and a commodity 208 on which the paper 210 printed with the barcode 209 is adhered, and converts the reflected light from the commodity 208 to an electric signal to output the image information of the commodity 208.

The lighting unit 201 is a light source irradiating light onto the area in which the imaging pickup element 203 pickups an image. In this embodiment, the lighting unit 201 is formed by arranging four light-illuminating diodes 204, 205, 206 and 207 around the imaging pickup element 203, and has a light irradiation range substantially as large as or larger than the image imaging pickup area of the imaging pickup element 203.

FIG. 3 is a block diagram illustrating the structure of the code reader 2. A lens 301, with which the light in an imaging pickup area is condensed to be imaged on the imaging pickup element 203, is configured in the reading window (referring to FIG. 2). The imaging pickup element 203 converts a light signal irradiated onto the imaging pickup element 203 to an electric signal according to an imaging pickup signal input from a imaging pickup control unit 401 and outputs the electric signal to a barcode decoder 302 as image information.

The barcode decoder 302 extracts the image of the barcode 209 contained in the image information input from the imaging pickup element 203 and reads commodity-related information from the extracted image of the barcode 209.

A control unit 303, which controls the imaging pickup of the imaging pickup element 203 and the light irradiation of the lighting unit 201, comprises a main control unit 304 and an illumination drive circuit 305. The main control unit 304 comprises a CPU (Central Processing Unit), an RAM (Random Access Memory), an ROM (Read Only Memory) and an I/O port. Moreover, the main control unit 304 is connected with the imaging pickup element 203 and the illumination drive circuit 305 to control them respectively.

The CPU of the main control unit 304 acts according to the program stored in the ROM developed on the RAM, thereby functioning as an imaging pickup control unit 401, an image acquisition unit 402 and a light source control unit 403, as shown in FIG. 3.

The imaging pickup control unit 401 outputs an imaging pickup signal indicating an imaging pickup to the imaging pickup element 203 to control the imaging pickup of the imaging pickup element 203.

The imaging pickup element 203 pickups the image in an imaging pickup area when the imaging pickup signal is in an 'ON' state. Moreover, the imaging pickup element 203 pickups nothing when the imaging pickup signal is in an 'OFF' state.

The image acquisition unit 402 sends the image pickup by the imaging pickup element 203 to the RAM of the main control unit 304. Moreover, the image acquisition unit 402 analyzes the acquired image and reads discount information from a discount coupon image displayed on a liquid crystal screen.

The light source control unit 403 outputs a light control signal indicating a light irradiation to the illumination drive unit 305 and controls the light irradiation (illumination) of the lighting unit 201 through the illumination drive unit 305.

The illumination drive unit 305 drives the lighting unit 201 to irradiate (illumination) light when the light control signal is in an 'ON' state. Moreover, the illumination drive unit 305 disables the lighting unit 201 to irradiate (illumination) light when the light control signal is in an 'OFF' state.

Moreover, the light source control unit 403 is connected with the mode switching switch 27 to switch between the code reading mode and the liquid crystal screen reading mode according to the state of the mode switching switch 27 to carry out an illumination control on the lighting unit 201.

Next, the actions of the light source control unit 403 in the code reading mode and the liquid crystal screen reading mode are described. By changing light illuminating patterns according to the switching in modes, the light source control unit 403 enables the lighting unit 201 to illuminate light.

FIG. 4 is a timing chart illustrating an output timing of a light control signal in a code reading mode and a liquid crystal screen reading mode.

FIG. 4(a) shows the output timing of an imaging pickup signal. As an example of the imaging pickup control unit 401, as shown in FIG. 4(a), the pulse signal of a rectangular wave having predetermined pulse length, pulse period and pulse interval is output as an imaging pickup signal.

FIG. 4(b) shows the output timing of a light control signal in the code reading mode.

As an example of the imaging pickup control unit 403, as shown in FIG. 4(b), the pulse signal of a rectangular wave having the same pulse length as an imaging pickup signal is output as a light control signal.

As shown in FIG. 4(b), the light source control unit 403 makes the lighting unit 201 illumination pulsed light continuously in the code reading mode. Moreover, the light source control unit 403 makes a light control signal and an imaging pickup signal output synchronously in the code reading mode. That is, as shown in FIG. 4(a) and FIG. 4(b), an imaging pickup signal and a light control signal are both in an 'ON' state in t0-t1, t2-t3 and t4-t5, and the pulse signal of a rectangular wave having a pulse length t and a pulse period T is similarly output continuously after t5. In this way, the lighting unit 201 gives off pulsed light synchronously with the imaging pickup signal.

As a result, in the code reading mode, the light source control unit 403 enables the lighting unit 201 to illuminate light in accordance with the imaging pickup timing of the imaging pickup element 203. Therefore, the commodity 208 existing or placed in the imaging pickup area may be effectively illuminated, thus improving the quality of the image acquired by the image acquisition unit 402.

FIG. 4(*b*) shows the output timing of a light control signal in the liquid crystal screen reading mode.

As shown in FIG. 4(*c*), the light source control unit 403 makes the lighting unit 201 illumination pulsed light intermittently in the liquid crystal screen reading mode. That is, as shown in FIG. 4(*c*), a light control signal is intermittently changed to be in an 'ON' state in t6-t2, t7-t4, t8-t9 and t10-t11. In this way, the lighting unit 201 gives off pulsed light intermittently with a light illuminating pattern different from that in the code reading mode.

Here, the pulse period T of a light control signal in the code reading mode is, for example, ⅟₃₀ second to a small fraction of a second, thus, the pulsed light may not be recognized by the eyes of human being and instead considered to be continuous light.

Compared with the code reading mode, in the liquid crystal screen reading mode, no light is predetermined off in a long time interval t4-t8 following periods t6-t12 and t7-t4 in which light is irradiated, and pulsed light is predetermined off after t8. As a result, in the liquid crystal screen reading mode, a light irradiating time interval 41 (e.g. t6-t4) and a no-light time interval 42 (e.g. t4-t8) are set in the liquid crystal screen reading mode, and the no-light time interval 42 is set to have such a length that the disappear of light may be recognized by the eyes of human being. By irradiating light in this way, the flickering light of the lighting unit 201 may be recognized in the liquid crystal screen reading mode.

As stated above, the light source control unit 403 enables the lighting unit 201 to illuminate light continuously in the code reading mode and flickeringly in the liquid crystal screen reading mode, and different light illuminating patterns are correspondingly used in different modes. Thus, the operator may recognize the switching between modes.

Moreover, the light source control unit 403 desynchronizes a light control signal and an imaging pickup signal in the liquid crystal screen reading mode. That is, as shown in FIG. 4(*a*) and FIG. 4(*c*), the light source control unit 403 makes the light control signal in an 'ON' state in time intervals t6-t2 and t7-t4 of the periods t1-t2 and t3-t4 in which the imaging pickup signal is in an 'OFF' state. In this way, the light source control unit 403 enables the lighting unit 201 to illuminate light in the timing different from the imaging pickup timing of the imaging pickup element 203.

Therefore, it is avoided to image pickup in the high-intensity reflected light period of the liquid crystal screen, thus improving the quality of the image acquired by the image acquisition unit 402.

Moreover, in the example shown in FIG. 4, the pulse length 4 of a light control signal in the liquid crystal screen reading mode is set to be as long as that of a imaging pickup signal, however, the pulse length is not limited to this and may be other lengths.

Figure 5:
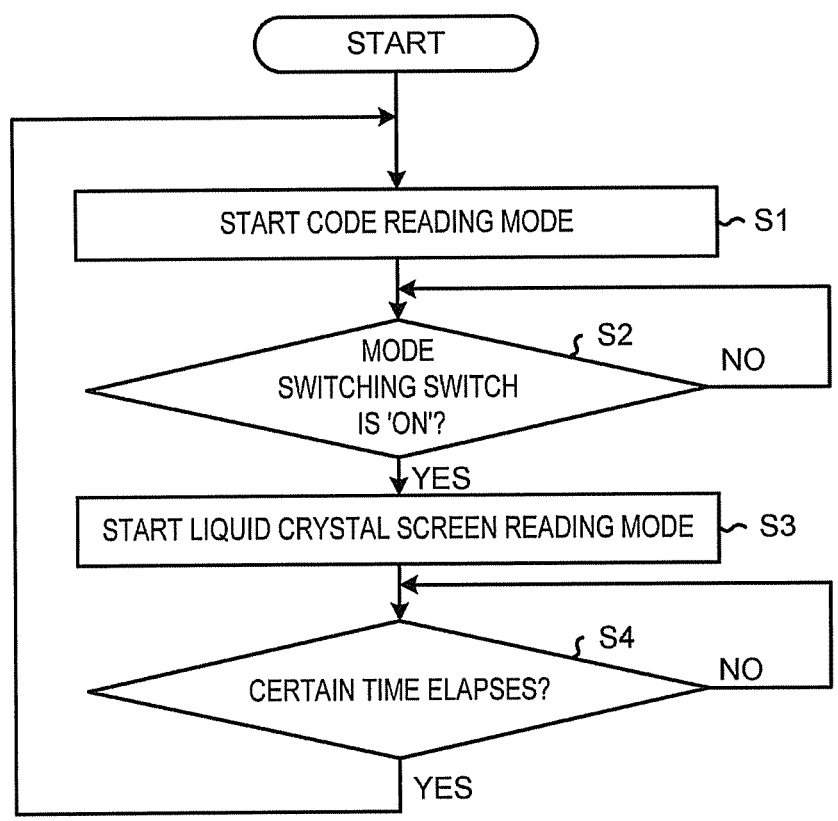
FIG. 5 is a flow chart illustrating the flow of a mode switching processing carried out by the code reader.

Next, the flow of a mode switching processing is described. FIG. 5 is a flow chart illustrating the flow of a mode switching processing carried out by the code reader 2.

When the power switch (not shown) of the code reader 2 is switched on, the main control unit 304 of the code reader 2 starts the code reading mode (Act S1). That is, the light source control unit 403 outputs the light control signal shown in, for example, FIG. 4(*b*) to the illumination drive circuit 305 to make the lighting unit 201 illumination pulsed light continuously.

Then, the main control unit 304 determines whether or not the mode switching switch 27 is pressed down to be in an 'ON' state (Act S2). If the mode switching switch 27 is in an 'OFF' state instead of 'ON' state (Act S2: No), the flow is returned to Act S2 to wait for an input. On the other hand, if the mode switching switch 27 is in an 'ON' state (Act S2: Yes), the liquid crystal screen reading mode is started (Act S3). That is, the light source control unit 403 outputs the light control signal shown in, for example, FIG. 4(*c*) to the illumination drive circuit 305 to make the lighting unit 201 illumination pulsed light intermittently.

Sequentially, the main control unit 304 determines whether or not a predetermined period elapses from the moment the liquid crystal screen reading mode is started (Act S4). If not (Act S4: No), the flow returns to Act 4 to wait for a processing until the predetermined period elapses. If so (Act S4: Yes), the liquid crystal screen reading mode is ended and the code reading mode is started (Act S1).

Moreover, in Act S4 shown in FIG. 5, a mode switching is carried out based on whether or not a predetermined period elapses, however, a switching from the liquid crystal reading mode to the code reading mode may also be made if the image of the liquid crystal screen is read or the information contained in the image is all read.

Thus, in accordance with the first embodiment, the light illuminating pattern of the lighting unit 201 is changed in the code reading mode and the liquid crystal screen mode so that the operator may recognize the change in the modes.

(Second Embodiment)

The actions for switching between the code reading mode and a standby mode are described in second embodiment. The standby mode refers herein to the power-saving mode of the code reader 2, in which the imaging pickup action of the imaging pickup element 203 is eliminated. However, the standby mode is not limited to the specific power-saving mode.

Figure 6:
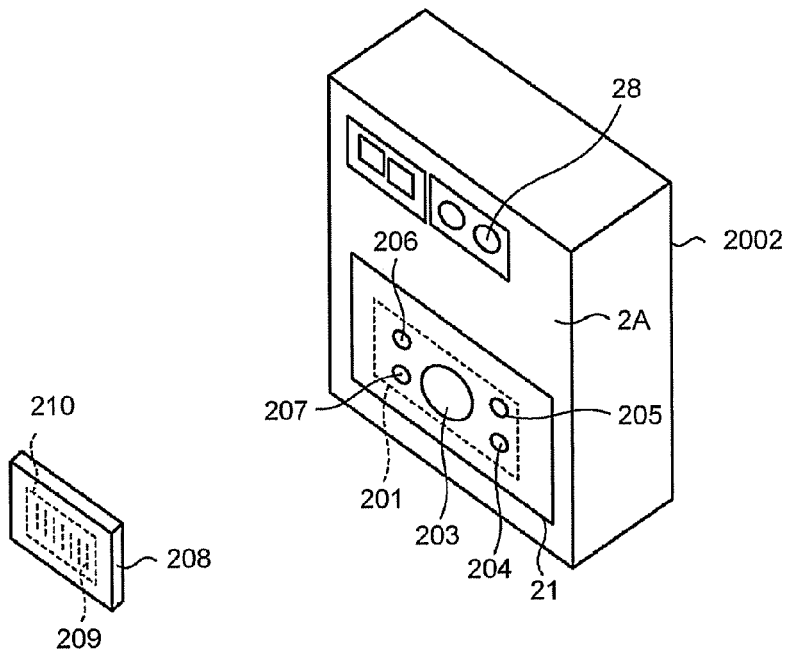
FIG. 6 is an external perspective view illustrating the structure of the code reader of a second embodiment.

FIG. 6 is an external perspective view illustrating the structure of the code reader 2002 of a second embodiment. The elements identical to those shown in FIG. 2 are identified with the same symbols and not described here. As shown in FIG. 6, the code reader 2002 has an infrared sensor 28 on the front surface 2*a* of the main body thereof. The infrared sensor 28 is configured facing the imaging pickup area by the imaging pickup element 203 to output a detection signal after detecting an object in the detection area of a sensor placed nearby the front surface 2*a* of the code reader 2002.

Figure 7:
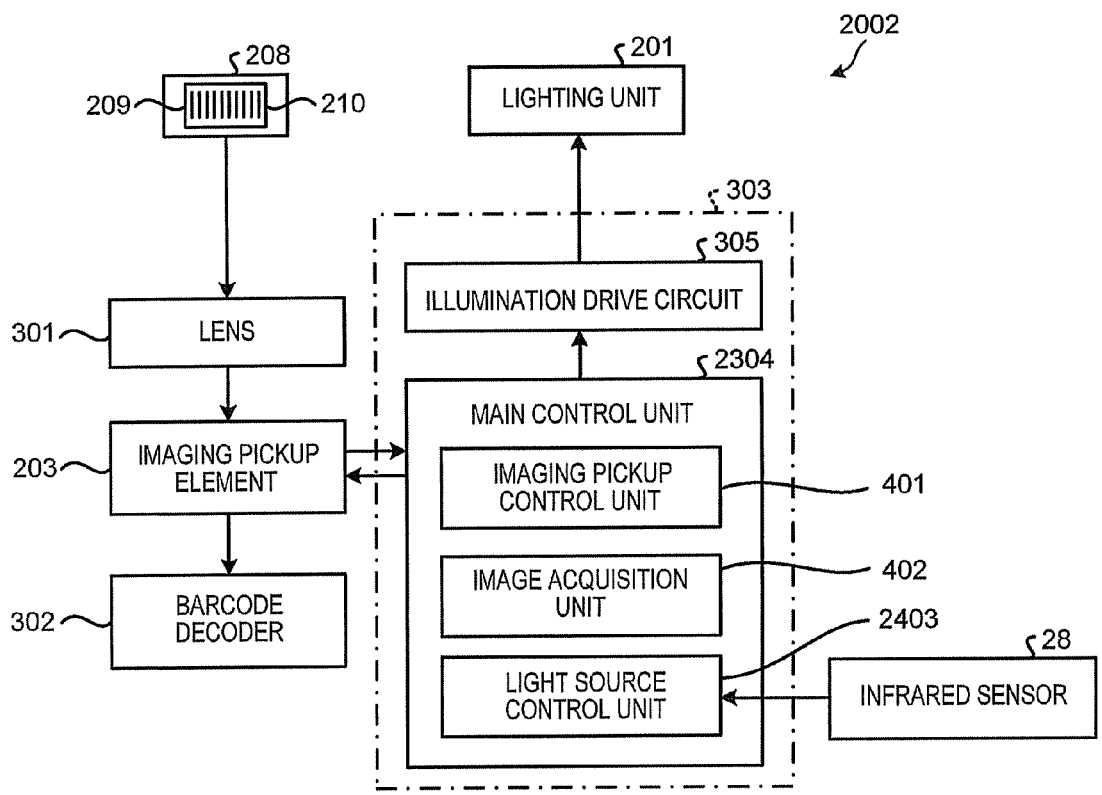
FIG. 7 is a block diagram illustrating the structure of the code reader.

FIG. 7 is a block diagram illustrating the structure of the code reader 2002. The elements identical to those shown in FIG. 3 are identified with the same symbols and not described here. As shown in FIG. 7, the detection signal of the infrared sensor 28 is input in a light source control unit 2403. The input of the detection signal of the infrared sensor 28 in the light source control unit 2403 is hereinafter referred to as the response of the infrared sensor 28.

The main control unit 2304 of the code reader 2002 switches from the code reading mode to the standby mode if the infrared sensor 28 makes no response in a period longer than a predetermined time in the code reading mode. Moreover, the main control unit 2304 switches from the standby mode to the code reading mode if the infrared sensor 28 makes a response in the standby mode.

The light source control unit 2403 switches between the code reading mode and the standby mode according to the input of the infrared sensor 28 to control the illumination of the lighting unit 201 in the both modes.

Next, the actions of the light source control unit 2403 in the code reading mode and the standby mode are described.

Figure 8:
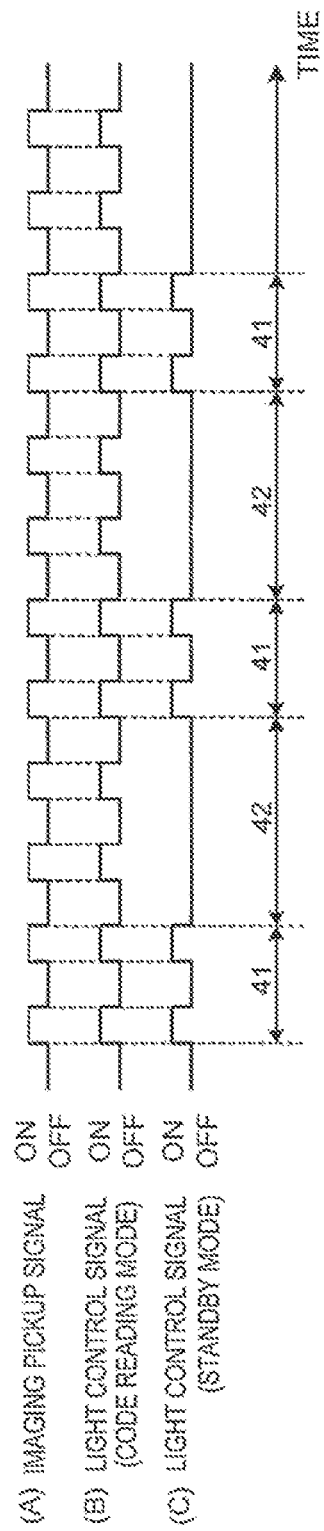
FIG. 8 is a timing chart illustrating the output timings of a light control signal in the code reading mode and the standby mode.

FIG. 8 is a timing chart illustrating the output timings of a light control signal in the code reading mode and the standby mode. FIG. 8(*a*) shows the output timing of an imaging pickup signal. FIG. 8(*b*) shows the output timing of a light control signal in the code reading mode, and FIG. 8(*c*) shows the output timing of a light control signal in the standby mode.

As shown in FIG. 8(*c*), the light source control unit 2403 makes the lighting unit 201 illumination pulsed light intermittently in the standby mode. That is, as shown in FIG. 8(*c*), an interval 41 in which a light control signal is in an 'ON' state to enable the light irradiation from the lighting unit 201 and an interval 42 in which a light control signal is in an 'OFF' state to disable the light irradiation from the lighting unit 201 are set alternatively, and the length of the no-light interval 42 is set to be have such a length that the disappear of light may be recognized by the eyes of human being. By irradiating light in this way, the light source control unit 2403 enables the lighting unit 201 to illumination flickering light.

On the other hand, as shown in FIG. 8(*b*), the light source control unit 2403 makes the lighting unit 201 illumination pulsed light continuously in the code reading mode, like in embodiment. As a result, the light source control unit 2403 enables the lighting unit 201 to illuminate light in the code reading mode and the standby mode by changing light illuminating patterns.

Moreover, in the standby mode, as the liquid crystal screen is not irradiated like in first embodiment, it is unnecessary to synchronize a light control signal with an imaging pickup signal. Thus, in the standby mode, the light source control unit 2403 may synchronize a light control signal with an imaging pickup signal or not.

Figure 9:
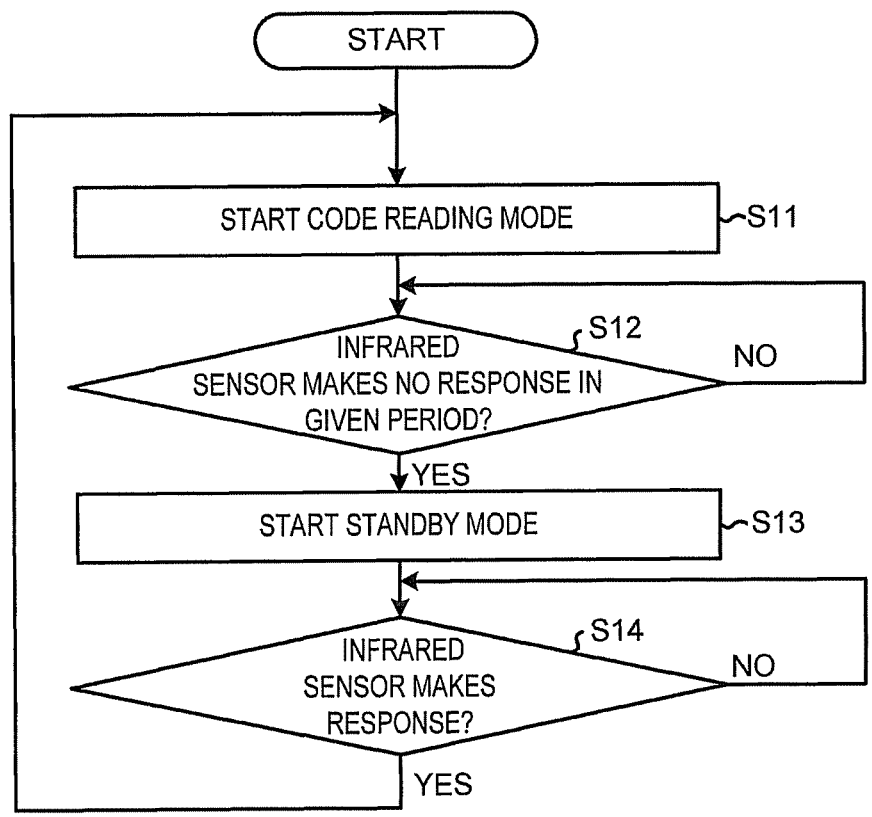
FIG. 9 is a flow chart illustrating the flow of a mode switching processing carried out by the code reader.

Next, the flow of a mode switching processing is described. FIG. 9 is a flow chart illustrating the flow of a mode switching processing carried out by the code reader 2002.

When the power switch (not shown) of the code reader 2002 is switched on, the main control unit 2304 of the code reader 2002 starts the code reading mode (Act S11). That is, the light source control unit 2403 outputs the light control signal shown in, for example, FIG. 8(*b*) to the illumination drive circuit 305 to make the lighting unit 201 illumination pulsed light continuously.

Next, the main control unit 2304 determines whether or not the infrared sensor 28 makes no response in a period longer than a predetermined one (Act S12). The flow returns to Act S12 to wait for a processing if the infrared sensor 28 makes a response in the predetermined period (Act S12: No). On the other hand, if the infrared sensor 28 makes no response in a period longer than a predetermined one (Act S12: Yes), the code reading mode is ended to start the standby mode (Act S13). That is, the light source control unit 2403 outputs the light control signal shown in, for example, FIG. 8(*c*) to the illumination drive circuit 305 to make the lighting unit 201 illumination pulsed light intermittently.

Then, the main control unit 2304 determines whether or not the infrared sensor 28 makes a response (Act S14). If not (Act S14: No), the flow returns to Act 14 to wait until the infrared sensor makes a response. If so (Act S14: Yes), the standby mode is ended to start the code reading mode (Act S11).

As a result, in accordance with second embodiment, the light-illuminating pattern of the lighting unit 201 is changed in the code reading mode and the standby mode so that the operator may recognize the change in the modes.

Moreover, the programs executed by the code readers 2 and 2002 in first and second embodiments are be provided by being pre-programmed in an ROM, however, the present invention is not limited to this. The programs executed in by the code readers 2 and 2002 may also be provided by being stored in computer-readable storage mediums such as CD-ROM, FD (floppy disk), CD-R and DVD (digital versatile disk) as an installable or executable file.

In addition, the programs executed by the code readers 2 and 2002 in first and second embodiments may also be stored in a computer connected with a network such as the Internet and loaded from the network to be used. In addition, the programs executed by the code readers 2 and 2002 in first and second embodiments may also be provided or published by networks such as the Internet.

The programs executed by the code readers 2 and 2002 in first and second embodiments are modular elements containing the above-described elements (the main control unit 304, the imaging pickup control unit 401, the image acquisition unit 402 and the light source control units 403 and 2403), a CPU serving as a piece of actual hardware loads each of the above-described elements to a primary memory device to generate the above-described elements on the primary memory device by reading the programs out from the ROM and executing the read program.

Moreover, in the description above, the code reader 2 which carries out a mode switching using a mode switching switch 27 (referring to FIG. 2 and FIG. 3) is described in first embodiment, and the code reader 2002 which carries out a mode switching using an infrared sensor 28 (referring to FIG. 6 and FIG. 7) is described in second embodiment, however, the mode switching switch 27 and the infrared sensor 28 may be both configured on a code reader. Moreover, a code reader may also carry out a mode switching according to either switching of the mode switching switch 27 or the response of the infrared sensor 28.

(Third Embodiment)

In first and second embodiments, each above-mentioned processing is carried out by the control unit 303 of the code readers 2 and 2002, however, the processing may also be carried out by a POS terminal 3. Moreover, in first and second embodiments, the description is predetermined on a case where code readers 2 and 2002 are separated from the POS terminal 3, however, the code readers may also be integrated with the POS terminal 3.

Therefore, in third embodiment where a code reader is integrated with a POS terminal, a self-checkout apparatus (hereinafter referred to as self POS) using a built-in scanner is described. The self POS is a sales data processing device that is installed in a supermarket or other shops for a customer to register commodities and check account as an operator.

Figure 10:
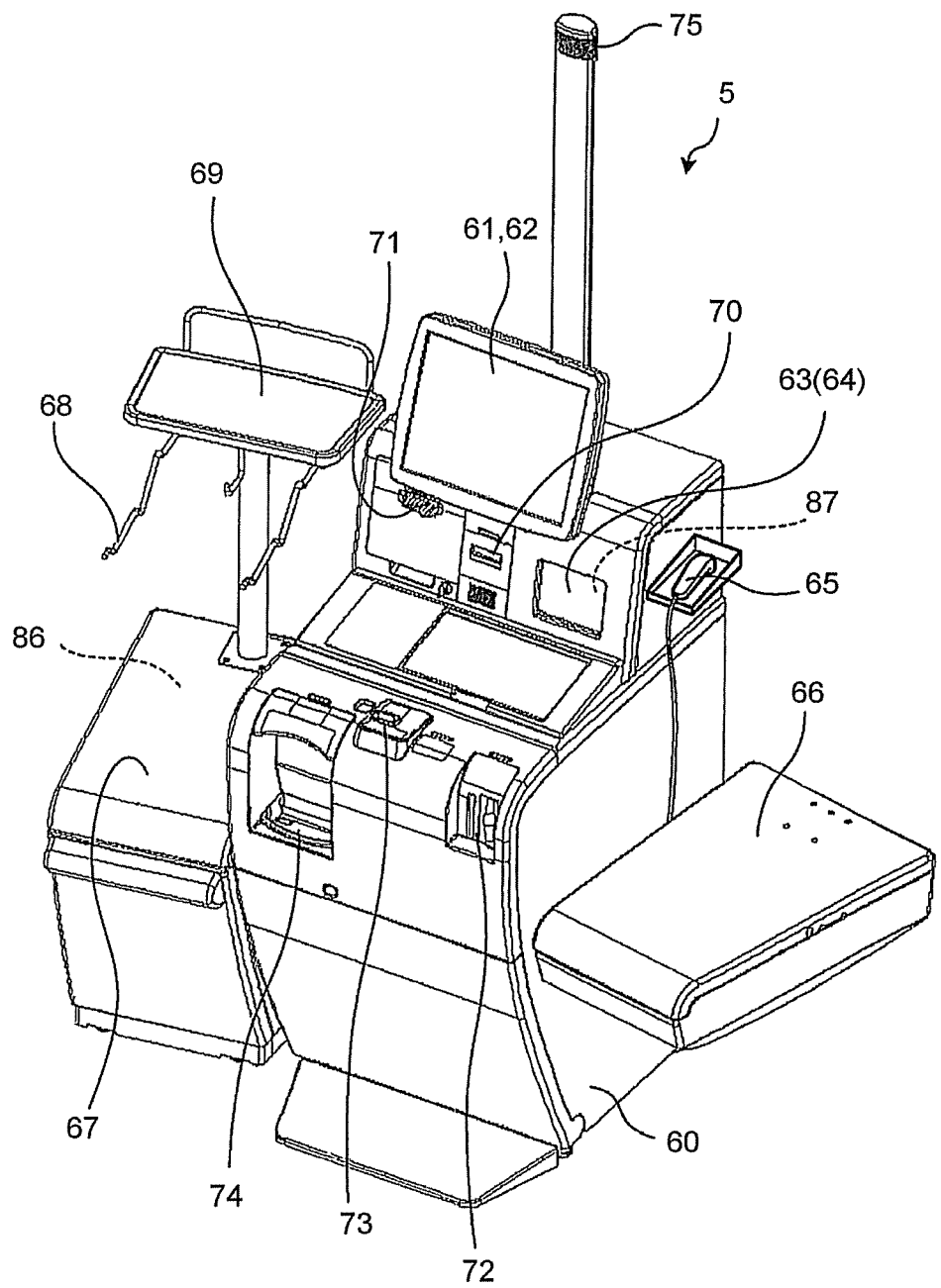
FIG. 10 is an external perspective, view illustrating the structure of a self POS of a third embodiment.

FIG. 10 is an external perspective view illustrating the structure of a self POS 5 of a third embodiment. A display 62 having a touch panel 61 on the surface is configured above the main body 60 of the self POS 5. Moreover, a reading window 63 is configured on the main body 60 below the display 62. A scanner 64 is configured on the inner side of the reading window 63 to read the code symbol (e.g. barcode and two-dimensional code) adhered on a commodity. Moreover, a manual scanner 65 is connected with the main body 60 via an interface.

The scanner 64 may be a device having the same structure with the code reader 2 shown in FIG. 2 and FIG. 3. However, in this embodiment, the function of the main control unit 304 (referring to FIG. 3) of the code reader 2 is achieved by the control unit 50 (referring to FIG. 11) of the self POS 5, therefore, the scanner 64 is recorded as a scanner having a different structure from the code reader 2. The other elements of the scanner 64 except the main control 304 are the same as those of the code reader 2.

The customer acting as an operator may use the scanner 64 or the manual scanner 65 to read the code symbol (e.g. barcode or two-dimensional code) adhered on the commodity, thereby registering the sales of the purchased commodities using the commodity code contained in the code symbol. Moreover, an infrared sensor 87 is configured on the inner side of the reading window 63 to detect the object (e.g. commodity or hand) placed in the reading window 63 such as commodity.

The display 62, which may be a liquid crystal display, may display a guidance screen for displaying the operation method of the self POS 5 for the customer, an input screen for inputting the commodity information of a commodity adhered with no code symbol, a registration screen for displaying the commodity information read by the scanner 64 or the manual scanner 65, and clearing screen for displaying a sum amount or a deposit amount or a change amount and the like of commodities and a settlement screen and the like for the customer to select a payment method.

Moreover, a card inserting port 70 is configured on the main body 60 of the self POS 5 for the customer to insert a point card or coupon card for clearing. Moreover, an receipt issuing port 71 is configured on the main body 60 to output the invoice printed by a printer 83 (referring to FIG. 11) configured in the main body.

In addition, a bill depositing and dispensing port 72 for receiving paper moneys for clearing and changing paper money, a coin depositing unit 73 for inputting coins during clearing, a coin dispensing port 74 for receiving changing coins are configured on the main body 60. The paper moneys or coins input from the bill depositing and dispensing port 72 and the coin depositing unit 73 are accommodated in a cash circulation unit 85 (referring to FIG. 11) in the main body 60. Moreover, the paper moneys or coins disbursed from the cash circulation unit are conveyed to the bill depositing and dispensing port 72 or the coin dispensing port 74.

Moreover, a pole is configured on the upper surface of the main body 60, an alarm light 75, which is turned on when there is an abnormality in the self POS 5 or a call for a shop assistant, is configured on the upper part of the pole Moreover, a commodity placing table 66 is configured on the right of the main body 60 to carry the unpaid commodities in a shopping basket while a commodity placing table 67 is configured on the left of the main body 60 to carry the paid commodities in the shopping basket. A temporary placing table 69 is configured on the pole on the upper surface of the commodity placing table 67 to temporarily hold the commodities paid and to be bagged. Moreover, a bag hook 68 is configured in front of the temporary placing table 69 to hook a bag containing the paid commodities. A weighting device 86 is configured in the commodity placing table 67 to weigh the objects placed on the commodity placing table 67, the bag hook 68 and the temporary placing table 69.

Figure 11:
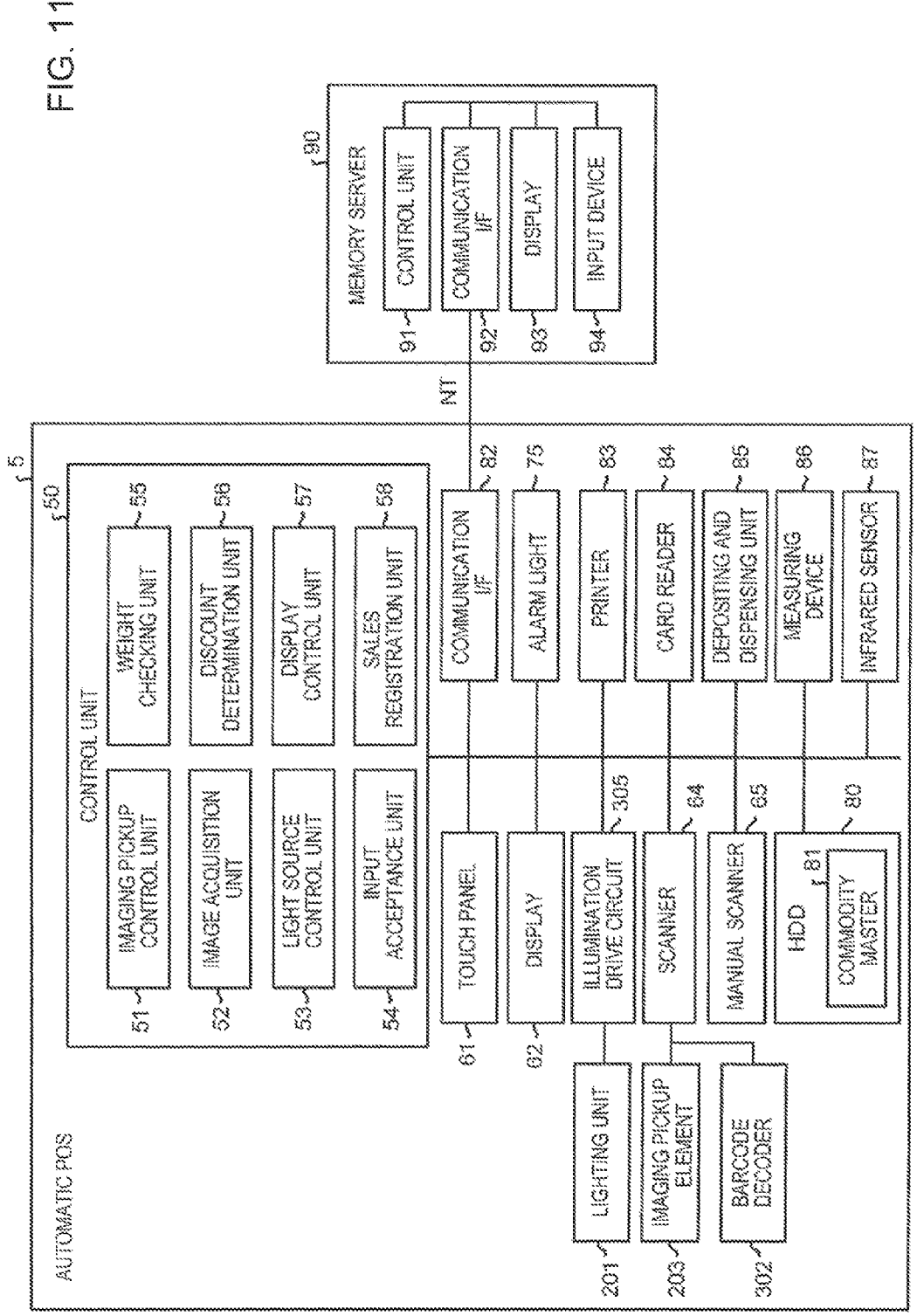
FIG. 11 is a block diagram illustrating the functional elements of the self POS.

Next, the functional elements of the self POS 5 are described. FIG. 11 is a block diagram illustrating the functional elements of the self POS 5. The self POS 5 comprises a control unit consisting of a computer composed of a CPU, an ROM functioning as a memory unit and an RAM (all not shown). The programs and data executed by the CPU are stored in the ROM. The RAM, which stores data and program temporarily when the CPU executes programs, also stores the sales data representing the sales data representing the sales record of commodities and screen representation data representing each screen displayed on the display 62.

The control unit 50 is connected with the touch panel 61, the display 62, the scanner 64, the manual scanner 65, an HDD 80, a communication I/F 82, the alarm light 75, the printer 83, a card reader 84, the cash circulation unit 85, the weighting device 86 and the infrared sensor 87 via interfaces. The control unit 50 controls the whole system of the self POS 5 by controlling the devices connected therewith.

Moreover, similar to the code reader 2 shown in FIG. 2, the scanner 64 comprises an imaging pickup element 203, a barcode decoder 302 and a control unit 50 for controlling the actions of each other element. In addition, similar to the code reader 2 shown in FIG. 2, a lighting unit 201 is configured on the scanner 62 to light the imaging pickup area by the imaging pickup element 203. The control unit controls the illumination of the lighting unit 201 via an illumination drive circuit 305.

After a payment processing is finished, the printer 83 prints an invoice, which is then output from the receipt issuing port 71. The card reader 84 reads the information of a point card or coupon card that is inserted in the card inserting port 70 by the customer. The cash circulation unit 85 accommodates and deposits/dispenses paper moneys and coins.

A commodity master 81 is stored in the HDD 80. FIG. 12 is a view illustrating an example of the structure of a commodity master 81. As shown in FIG. 12, a commodity name, a unit price, a set commodity weight range, a discount marker representing whether or not a commodity is discounted commodity, a discounted price and a discount code for the discount processing of a commodity are stored in the commodity master 81 corresponding to a commodity code.

Returning to FIG. 11, with the communication I/F 82, the control unit 50 may communicate with a store server 90 that is connected with the control unit 50 via a network such as an LAN (Local Area Network) and a server terminal (not shown) for assisting a shop assistant (server) in automatic checking. The store server 90 globally manages the sales registration carried out by one or more self POS terminals 5 installed in a shop.

As shown in FIG. 11, the store server 90, which is structured as a normal computer, comprises a control unit 91 having a CPU, an ROM and an RAM, a communication I/F 92, a display 93 and input device such as keyboard. The control unit 91 communicates in data with the self POS 5 via the communication I/F 92 and a network to update or edit the data contained in the commodity master 81.

Next, the functional elements of the self POS 5 are described in more detail. By developing and executing the program stored in the ROM for the use in this embodiment on the RAM, the control unit 50 of the self POS 5 serves as a imaging pickup control unit 51, an image acquisition unit 52, a light source control unit 53, an input acceptance unit 54, a weight checking unit 55, a discount determination unit 56, a display control unit 57 and a sales registration unit 58, as shown in FIG. 11.

The imaging pickup control unit 51 having the same function with the imaging pickup control unit 401 (referring to FIG. 3) of the code reader 2 outputs a imaging pickup signal to the imaging pickup element 203 of the scanner 64 to control the imaging pickup of the imaging pickup element 203.

The image acquisition unit 52 acquires the image pickup by the imaging pickup element 203 into the RAM of the control unit 50.

The light source control unit 53 having the same function with the light source control unit 403 (referring to FIG. 3) of the code reader 2 controls the illumination of the lighting unit 201 by receiving a light control signal to the illumination drive circuit 305. Moreover, in the case where a commodity is determined by the discount determination unit 56 described later as a discounted object, the light source control unit 53 switches a code reading mode to a liquid crystal screen reading mode (referring to FIG. 4) to control the illumination of the lighting unit 201. The code reading mode and the liquid crystal screen reading mode have been described in first embodiment and are therefore not repeatedly described here.

In addition, the light source control unit 53 switches the light illuminating mode of the lighting unit 201 to a standby mode (referring to FIG. 8) in the case where the infrared sensor makes no response in a predetermined time. The standby mode has been described in first embodiment and is therefore not repeatedly described here.

The input acceptance unit 54 reads a commodity code or a discount code containing commodity discount information from the image of the code symbol contained in the image acquired by the image acquisition unit 52 and accepts the input of the code. The input acceptance unit 54 reads information from a code symbol here and may, however, read the information from other images in the case where the self POS 5 has a element capable of recognizing words, images and targets.

Moreover, in the case where the commodity code or discount code stored in a code symbol adhered on a commodity is read by the manual scanner 65, the input acceptance unit accepts the input of the code. Moreover, in the case where the input buttons representing commodity name and commodity quantity on the input screen displayed on the display 62 are touched to input a commodity name and a commodity quantity, the input acceptance unit 54 reads, based on the input achieved through the touch panel 61, a commodity code from the memory unit corresponding to the commodity purchased by the customer to accept the input of the commodity code.

The weight checking unit 55 reads a set weight range corresponding to the commodity code accepted by the input acceptance unit 54 from the commodity master 81, compares the set weight range with a change in the weight applied on the weighting device 86 (that is, a changed weight), and checks the weights to confirm the identity of the weights. That is, the weight checking unit 55 determines there is an identity in the weights if the difference value of the measurement results obtained by the weighting device 86 at different times, that is, the changed weight, is in the set weight range of the commodity. Moreover, the identity determination method for measuring a changed weight is available in the prior art and is therefore not described here in detail.

By reference to the commodity master 81, the discount determination unit 56 determines whether or not the commodity having the commodity code accepted by the input acceptance unit 54 is a discounted commodity. For instance, the discount determination unit 56 determines the commodity with a discount marker '1' as a discounted object and the commodity with a discount marker '0' as a no-discount object.

The display control unit 57 controls the display of the display 62 to display, on the display 62, a registration screen 620 (referring to FIG. 13) for a commodity registration and clearing screen for the payment of a deal.

Figure 13:
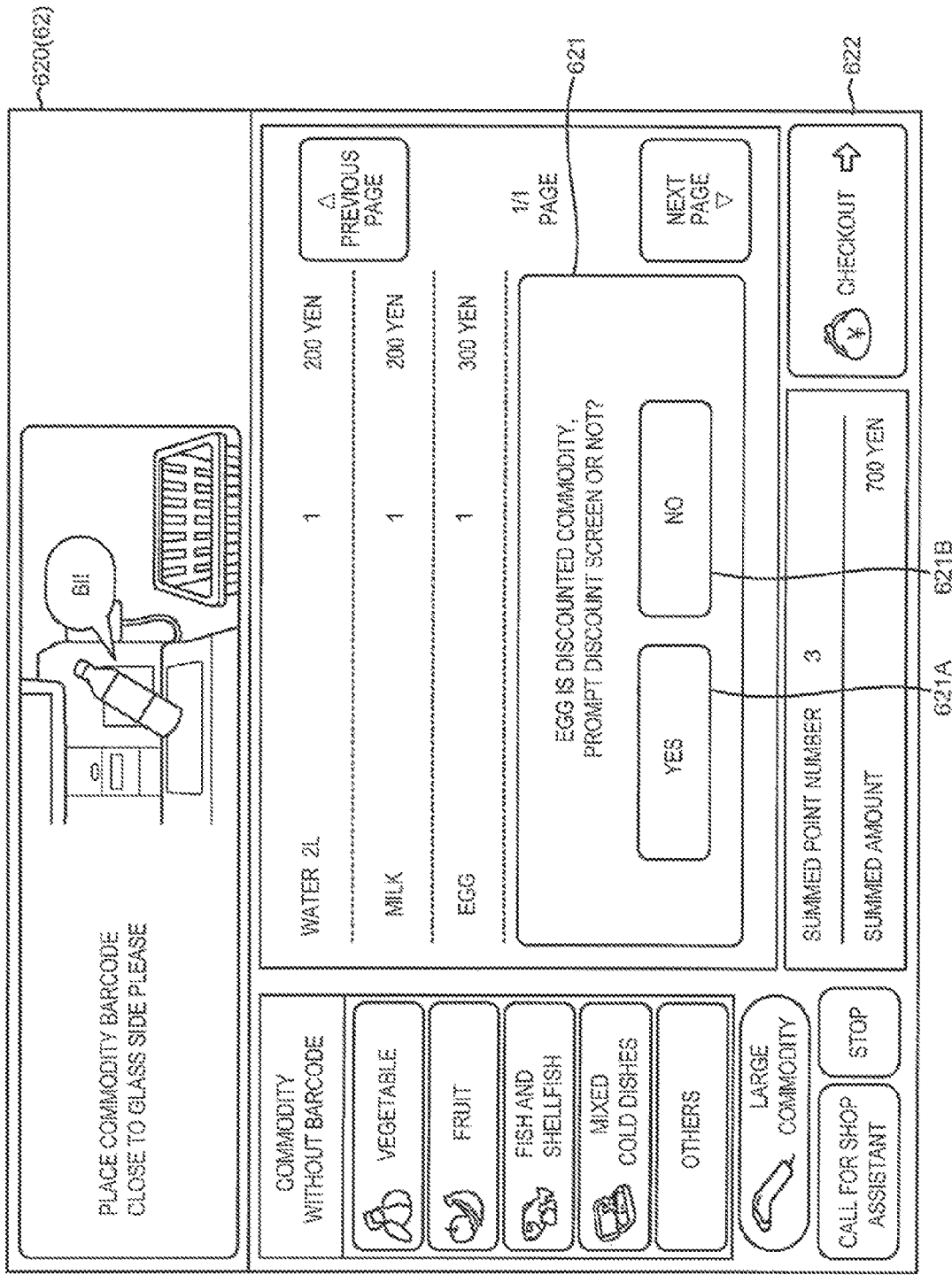
FIG. 13 is a view illustrating an example of a registration screen.

FIG. 13 is a view illustrating an example of a registration screen 620. As shown in FIG. 13, the display control unit 57 reads, from the commodity master 81, the commodity name and the unit price of the commodity having the commodity code accepted by the input acceptance unit 54, and displays the read commodity information on a registration screen 620. Moreover, a payment button 622 for the payment of a deal is set on the registration screen 620. The customer acting as an operator may select the payment button 622 to pay for a deal.

Moreover, the display control unit 57 displays error information 'inappropriate weight of commodity' on the display 62 if the weight determination unit 55 determines there is no identity in the set weight range corresponding to the commodity code and the changed weight.

Moreover, the display control unit 57 displays the display area 621 shown in FIG. 13 on the registration screen 620 if the discount determination unit 56 determines the commodity is a discounted object. Information 'the commodity is a discounted object' and information 'whether or not to prompt coupon (coupon screen) information for enjoying a discount' are contained in the display area 621. Moreover, a button 'Yes' 621a and a button 'No' 621b are displayed in the display area 621 corresponding to the information.

When the button 'No' 621b is selected, the display control unit 57 determines not to prompt a coupon, stops the display in the display area 621 and instead displays the registration screen 620 exclusively on the display 62. On the other hand, when the button 'Yes' 621a is selected, the display control unit 57 displays a guidance screen 623 (referring to FIG. 14) on the display 62 to remind the operator to read the coupon screen displayed on the display of the portable electronic device of the customer with the scanner 64, as shown in FIG. 14.

Figure 14:
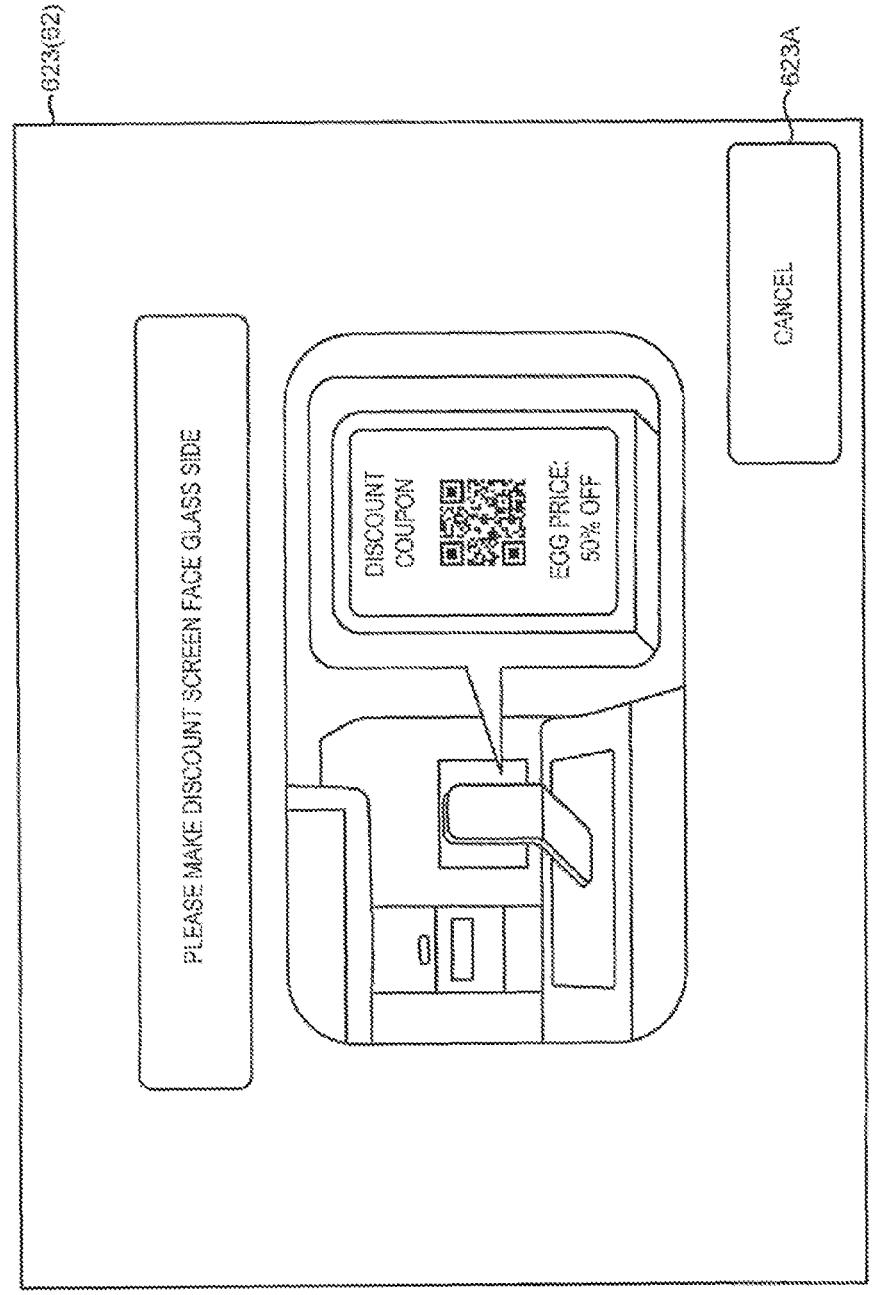
FIG. 14 is a view illustrating an example of a guidance screen.

FIG. 14 is a view illustrating an example of a guidance screen 623. As shown in FIG. 14, information 'make the coupon screen displayed on the display of the portable electronic device close to the reading window 63 to be read by the scanner 64' is displayed on the guidance screen 623. Moreover, a cancel button 623a is set on the guidance screen 623, when the cancel button 623a is selected, the display control unit 57 ends the display of the guidance screen 623 to display the registration screen 620 on the display 62.

The customer displays a coupon screen on the display of the portable electronic device according to the information displayed on the guidance screen 623 and places the coupon screen in front of the reading window 63. The image acquisition unit 52 acquires the image by the imaging pickup element 23, and the input acceptance unit 54 accepts the input of a discount code according to the code symbol contained in the image. The discount determination unit 56 determines whether or not the input discount code is an appropriate discount code stored in the commodity master 81.

The sales registration unit 58 takes the commodity having the commodity code accepted by the input acceptance unit 54 as a commodity purchased by the customer to conduct a sales registration and calculates the total amount of the commodities purchased by the customer. Moreover, in the case where the discount determination unit 56 determines the commodity is a discounted object and the discount code accepted is an appropriate discount code, the sales registration unit 58 calculates the discounted price of the commodity and then registers the discounted sales of the commodity. Moreover, as shown in FIG. 12, if there is a discounted price recorded in the commodity master 81 as a discounted selling price, the sales registration unit 58 applies the discounted price to the commodity that is a discounted object and then registers the sales of the commodity.

Figure 15:
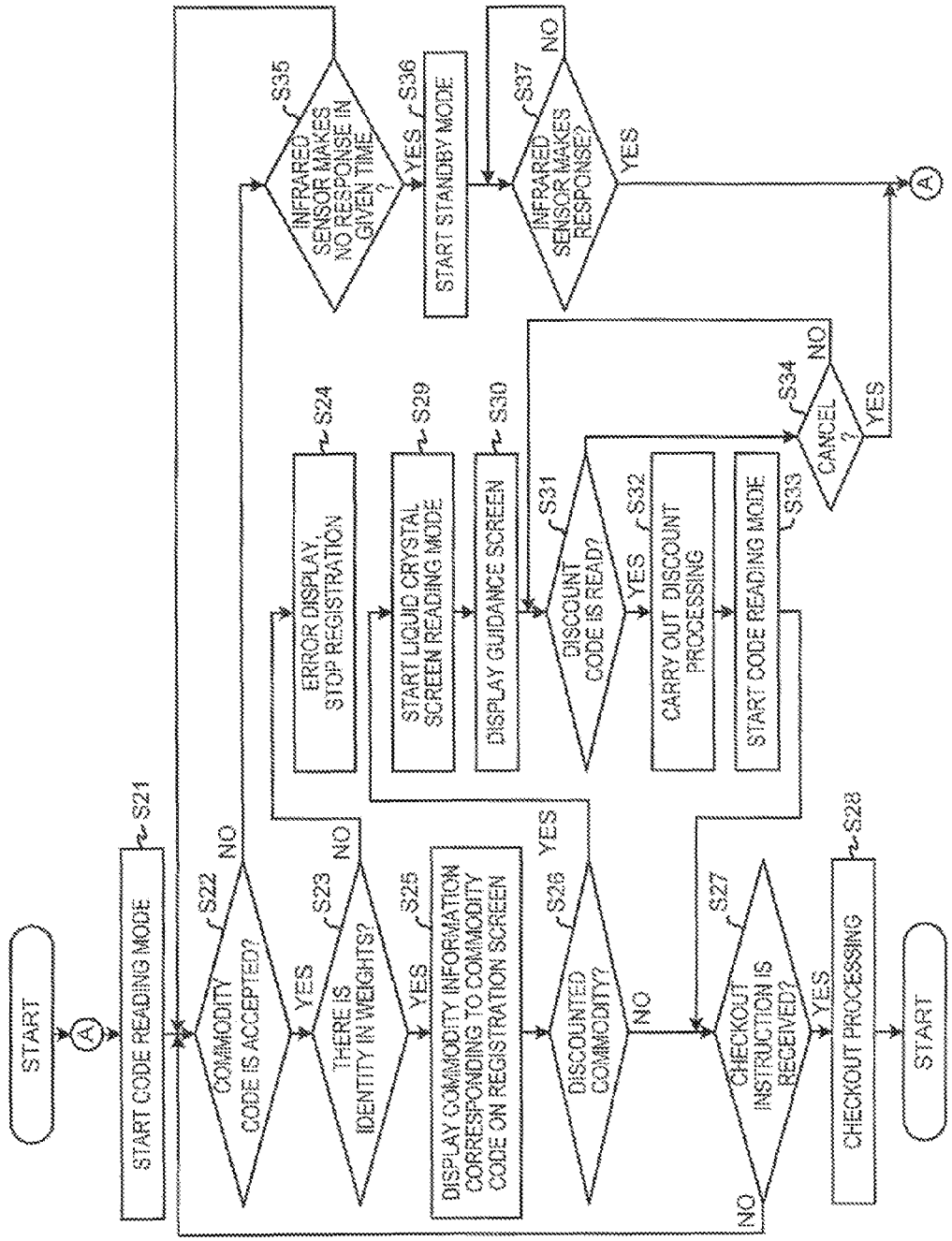
FIG. 15 is a flow chart illustrating the flow of a sales registration processing carried out by the self POS.

Next, the flow of the sales registration carried out by the self POS 5 is described with reference to FIG. 15. FIG. 15 is a flow chart illustrating the flow of a sales registration processing carried out by the self POS 5.

First, the light source control unit 53 starts the code reading mode to output the light control signal shown in, for example, FIG. 4(b) to the illumination drive circuit 305 to make the lighting unit 201 illumination pulsed light continuously (Act S21). The image acquisition unit 52 acquires the image by the scanner 64 into an RAM.

The input acceptance unit 54 determines whether or not the input of a commodity code is accepted according to the image of the code symbol contained in the image acquired by the image acquisition unit (Act S22). In the case where the input of a commodity code is accepted (Act S22: Yes), the weight checking unit 55 determines whether or not there is an identity in the set weight range that is read from the commodity master 81 according to the commodity code and the changed weight of the weighting device 86 (Act S23).

If there is no identity in the weights (Act S23: No), the display control unit 57 displays error information 'inappropriate weight' on the display 62, and the sales registration unit 58 stops the sales registration of the commodity (Act S24). On the other hand, if there is an identity in the weights (Act S23: Yes), the display control unit 57 reads the commodity information corresponding to the commodity code from the commodity master 81 and displays the read commodity information on the registration screen 620 (referring to FIG. 13) (Act S25).

Then, by reference to the commodity master 81, the discount determination unit 56 determines whether or not the commodity having the commodity code accepted by the input acceptance unit 54 is a discounted object (Act S26). If the commodity is not a discounted object (Act S26: No), the sales registration unit 58 selects the payment button 622 (referring to FIG. 13) on the registration screen 620 and determines whether or not clearing indication is received (Act S27). If no checkout indication is received (Act S27: No), the flow returns to Act S22 to continue the processing following Act S22. If clearing indication is received (Act S27: Yes), the sales registration unit 58 carries out clearing processing (Act S28) and then ends the whole flow.

On the other hand, if the commodity is a discounted commodity (Act S26: Yes), the light source control unit 53 switches the illumination control on the lighting unit 201 from the code reading mode to the liquid crystal screen reading mode (Act S29). Moreover, the display control unit 57 displays the guidance screen 623 shown in FIG. 14 on the display 62 (Act S30). As a result, it is recorded the display of the guidance screen 623 in the case where the result of Act S29 is Yes, however, the confirmation screen shown in the display area 621 shown in FIG. 13 may also be displayed before the display of the guidance screen 623 by the display control unit 57. The display order of the display screen and other displays of the display control unit 57 may be appropriately set.

Then, the image acquisition unit 52 acquires the image by the scanner 64 into the RAM, and the input acceptance unit 54 accepts the input of various kinds of information according to the image acquired by the image acquisition unit 52. sequentially, the input acceptance unit 54 determines whether or not the appropriate discount code corresponding to the commodity code processed in Act S22 is read according to the image acquired by the image acquisition unit 52 (Act S31).

If the appropriate discount code is read (Act S31: Yes), the sales registration unit 58 applies the discounted price stored in the commodity master to the commodity and registers the discounted sales of the commodity. That is, the sales registration unit 58 performs a discount processing on the commodity (Act S32). Then, the light source control unit 53 switches the illumination control on the lighting unit 201 from the liquid crystal screen reading mode to the code reading mode (Act S33) and returns to execute Act S27. On the other hand, if the discount code is not read or the discount code is different from the appropriate code registered in the commodity master 81 (Act S31: No), the flow returns to Act S34.

In Act S34, the input acceptance unit 54 determines whether or not the cancel button 623*a* on the guidance screen 623 (referring to FIG. 14) is selected. If not, (Act S34: No), the flow returns to Act S31. If so, (Act S34: Yes), the flow returns to Act S21 to enable the light source control unit to switch the light illuminating mode of the lighting unit 201 from the liquid crystal screen reading mode to the code reading mode (Act S21) to continue to carry out the processing following Act S22.

In Act S22, if the input of the commodity code is not accepted (Act S22: No), the light source control unit 53 determines whether or not the infrared sensor 87 makes no response in a period longer than a predetermined one (Act S35). If the infrared sensor 87 makes a response (Act S35: No), the flow returns to Act 22 to continue the processing following Act S22, as described above.

On the other hand, if the infrared sensor 87 makes no response in a period longer than a predetermined one (Act S35: Yes), the light source control unit 53 switches the light-illuminating code of the lighting unit 201 from the code reading mode to the standby mode (Act S36). Then, the light source control unit 53 determines, at predetermined intervals, whether or not the infrared sensor 87 makes a response (Act S37). The light source control unit 53 waits for a response in the no-response period of the sensor (Act S37: No) until the sensor makes a response (Act S37.). If the sensor makes a response (Act S37: Yes), the light source control unit 53 switches the light-illuminating mode of the lighting unit 201 from the standby mode to the code reading mode (Act S21) to continue to carry out the processing following Act S22.

In this way, in third embodiment, the self POS 5 enables the lighting unit 201 to illuminate light by changing light-illuminating patterns in the code reading mode, the liquid crystal screen reading mode and the standby mode. Therefore, the customer acting as an operator may recognize the change in the light illuminating mode of the lighting unit 201.

Moreover, in accordance with third embodiment, the self POS 5 switches the light illuminating mode of the lighting unit 201 to the liquid crystal screen reading mode when the commodity is a discounted object, so the operator may switch the light-illuminating mode unconsciously and easily.

Moreover, in the description above, it is described the form of the self POS 5, however, the POS terminal may also be in the following form: a POS terminal (e.g. the POS terminal 3 shown in FIG. 1) having each function described in this embodiment switches the light illuminating mode of a code reader connected therewith via an interface or network in the way described above.

Moreover, in the description above, as shown in Acts S35 and S36 shown in FIG. 15, the light-illuminating mode is switched to the standby mode if the infrared sensor makes no response in a predetermined period, however, the same switch may also be conducted according to other conditions. For instance, the light source control unit 53 switches the lighting unit 201 to the standby mode if the weighting device 86 detects no weight change in a predetermined time. Moreover, in the case where the self POS 5 has another weighting device in addition to the weighting device 86, the switch to the standby mode of the lighting unit 201 may also be conducted if the another weighting device detects no weight change in a predetermined time.

Moreover, the program executed by the self POS in this embodiment is provided by being pre-programmed in the ROM, however, the present invention is not limited to this.

The program executed by the self POS 5 in this embodiment may also be provided by being stored in computer-readable storage mediums such as CD-ROM, FD (floppy disk), CD-R and DVD (digital versatile disk) as an installable or executable file.

Moreover, the program executed by the self POS in this embodiment may also be stored in a computer connected with a network such as the Internet and loaded from the network to be used. In addition, the program executed by the self POS 5 in this embodiment may also be provided or published by networks such as the Internet.

As stated above, in first, second, and third embodiments, as the light illuminating patterns of the light source are different in different modes, the operator (shop assistant or customer) may recognize the change in the modes.

Moreover, in accordance with the embodiments above, the code reader 2, 2002 and the self POS 5 need no other guiding light different from the lighting unit 20 to inform the operator of a change in the modes. Therefore, the space or cost of the code reader 2, 2002 may be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A code reader, comprising:
An imaging pickup unit;
a light source configured to irradiate light onto an imaging pickup area by the imaging pickup unit;
a switching unit configured to switch between a code reading mode applicable for the imaging pickup unit to image pickup a code symbol in the imaging pickup area and a second mode which is applicable for the imaging pickup unit to image pickup a screen in the imaging pickup area; and
a light source control unit configured to enable the light source to illuminate light by changing light illuminating patterns when the switching unit switches between the code reading mode and the second mode.

2. The code reader according to claim 1, wherein
the light source control unit enables the light source to illuminate light continuously in the code reading mode and flickeringly in the second mode.

3. The code reader according to claims 2, further comprising:
a switching switch configured to switch between the code reading mode and the second mode; wherein
the switching unit switch between the code reading mode and the second mode according to the switch of the switching switch.

4. The code reader according to claim 1, wherein the second mode is a liquid crystal screen reading mode applicable for the imaging pickup unit to image pickup a liquid crystal screen in the imaging pickup area; and
the light source control unit enables the light source to time illuminating light to the timing of the imaging pickup by the imaging pickup unit in the code reading mode and to the timing which is different from the timing of the imaging pickup by the imaging pickup unit in the liquid crystal screen reading mode.

5. The code reader according to claim 4, wherein
the light source control unit enables the light source to time illuminating light to the timing which is different from the timing of the imaging pickup by receiving a light control signal which instruct the light to illuminate of the light source asynchronously with the imaging pickup signal which instruct the imaging pickup unit to image pickup in the liquid crystal screen reading mode.

6. The code reader according to claims 5, further comprising:
a switching switch configured to switch between the code reading mode and the second mode; wherein
the switching unit switch between the code reading mode and the second mode according to the switch of the switching switch.

7. The code reader according to claims 4, further comprising:
a switching switch configured to switch between the code reading mode and the second mode; wherein
the switching unit switch between the code reading mode and the second mode according to the switch of the switching switch.

8. The code reader according to claims 1, further comprising:
a switching switch configured to switch between the code reading mode and the second mode; wherein
the switching unit switch between the code reading mode and the second mode according to the switch of the switching switch.

9. The code reader according to claims 1, further comprising:
an infrared sensor configured to be set toward the imaging pickup area; wherein the switching unit switch from the code reading mode to the second mode when there is no response from the infrared sensor in a period longer than a predetermined time.

10. The code reader according to claims 1, further comprising:
a switching switch configured to switch between the code reading mode and the second mode; wherein
the switching unit switch between the code reading mode and the second mode according to the switch of the switching switch.

11. A method for reading code by a code reader comprising an imaging pickup unit and a light source configured to irradiate light onto an imaging pickup area by the imaging pickup unit, including:
switching between a code reading mode applicable for the imaging pickup unit to image pickup a code symbol in the imaging pickup area and a second mode which is applicable for the imaging pickup unit to image pickup a screen in the imaging pickup area; and
illuminating light of the light source by changing light illuminating patterns when the switching unit switches between the code reading mode and the second mode.

12. A sales data processing apparatus, comprising:
a switching unit configured to switch between a code reading mode applicable for the imaging pickup unit to image pickup a code symbol in the imaging pickup area and a second mode which is applicable for the imaging pickup unit to image pickup a screen in the imaging pickup area;
a light source control unit configured to enable the light source to illuminate light which illuminate on the imaging pickup area by changing light illuminating patterns. when the switching unit switches between the code reading mode and the second mode;

a reading unit configured to read a commodity code from the code symbol; and a sales registration unit configured to read the commodity information corresponding to the commodity code read by the reading unit from a memory unit in which the commodity information of each commodity is stored corresponding to a commodity code and to carry out the selling registration of the commodity using the commodity information.

13. The sales data processing apparatus according to claim 12, further comprising:

a weighting unit configured to measure the weight of a commodity;

a weight checking unit configured to read a weight range corresponding to the commodity code read by the reading unit from the memory unit in which an allowable commodity weight range is stored corresponding to the commodity code of a commodity and to determine the identity with the weight measured by the weighting unit; wherein the sales registration unit carry out the selling registration of the commodity which is determined to have the identity by the weight checking unit.

* * * * *